INVENTOR.
WALDO H. KLIEVER
BY
Max L. Wymore
ATTORNEY

Oct. 19, 1965 W. H. KLIEVER 3,213,442

INTERPOLATING BINARY SCALE READER

Filed March 9, 1959 6 Sheets-Sheet 2

INVENTOR.
WALDO H. KLIEVER
BY
Max L. Wymore
ATTORNEY

INVENTOR.
WALDO H. KLIEVER
BY
Max L. Wymore
ATTORNEY

Oct. 19, 1965 W. H. KLIEVER 3,213,442

INTERPOLATING BINARY SCALE READER

Filed March 9, 1959

6 Sheets-Sheet 4

INVENTOR.
WALDO H. KLIEVER
BY
Max L. Wymore
ATTORNEY

INVENTOR.
WALDO H. KLIEVER
BY
Max L. Wymore
ATTORNEY

INVENTOR.
WALDO H. KLIEVER
BY
Max L. Wymore
ATTORNEY

United States Patent Office 3,213,442

Patented Oct. 19, 1965

3,213,442
INTERPOLATING BINARY SCALE READER

Waldo H. Kliever, 2472 Overlook Road, Cleveland Heights, Ohio

Filed Mar. 9, 1959, Ser. No. 798,008
19 Claims. (Cl. 340—347)

This invention relates to an improved scale reader and more particularly to a reader for use with a natural binary scale to provide unambiguous signals representative of the position of the reader with respect to the scale. This invention principally is directed to an improvement of the binary scale reader forming the subject matter of co-pending application Serial No. 573,154 filed March 22, 1956, now U.S. Patent No. 2,960,869 issued November 15, 1960 of which the present applicant is a co-inventor.

In use, either the reader of this invention or the scale may be mounted upon a linear displaceable member of a device, such as a machine tool, for example, and the other mounted upon a fixed portion of the machine tool. By means of a group of signals developed representative of the position of the scale and the reader with respect to each other, it is possible to identify the position of the displaceable element with respect to fixed position of the machine tool. This lends itself to the precision automatic positioning of a machine tool element, highly desirable in the art of automation.

The natural binary scale has $n$ columns of effectively transparent and effectively opaque areas arranged in a natural binary progression, each having $2^n$ rows, where $n$ is the number of binary digits in the scale. The natural binary progression is one in which the effectively transparent and effectively opaque areas are disposed in columns such that each column represents ascending powers of two.

Where data is a number in the binary system, or scale of two, in which only the digits 0 and 1 occur, the number 2 in the decimal scale corresponds to the number 1 0 in the binary scale, and may be represented by the simultaneous states of the two signals, the first of which is in the 1-state and the second in the 0-state. Similarly, the decimal scale number 3 is represented by both signals being in the 1-state and the decimal number 4 by three signals, the first of which is in the 1-state and the other two in the 0-state.

The signals may have a variety of physical forms, depending on the scale and reader, usually electrical or mechanical in nature, although signals of an optical, magnetic or other nature could be employed if desired. The data in the form of a signal is commonly transmitted from an input or source to an output by way of one or more channels in the form of pulses, which again may assume various physical forms. The absence of a pulse, in the ordinary significance of the term, on any significant channel or at any significant instant, may represent a digit 0 in the appropriate place in a number, and may also be regarded as the "pulse" or like phenomenon in the same way as that which represents the digit 1, since it has a discrete and unique interpretation.

From this it follows that, if a digit—say 0—is to be represented by the absence of a pulse in a significant place in the pattern, the corresponding effectively opaque or effectively transparent area may be physically indistinguishable from its general background—for example, if the effectively opaque or effectively transparent areas appear respectively on an effectively opaque or effectively transparent backing, an effectively opaque or effectively transparent area representing the digit 0 is constituted by a significant zone of the surface of the backing which may not be specifically defined by a boundary. The term effectively opaque or effectively transparent area is to be understood as including such a significant, though physically undefined, zone.

In this specification, the term "effectively opaque area" or "effectively transparent area" will be used to signify any durable discrete phenomena which is capable of identification and presentation as a signal to which a unique interpretation can be assigned. Such areas are to be understood as being effectively transparent or opaque to all forms of electromagnetic energy as well as physical movement. The process of identification and presentation will be termed herein "reading" and the term "durable" is intended to indicate that the effectively opaque areas and effectively transparent areas are not destroyed or changed by the reading process. A signal may be constituted by an electrical pulse or a mechanical displacement or any other identifiable occurrence such as an optical, magnetic or audible effect. A group or train of signals will be understood to include the case of a single signal or the absence of a signal in a single significant place where such a single significant place has a definite or discrete interpretation. The term "decimal digit position" is used to identify a particular row. A natural binary scale having five columns will have $2^5$ or 32 rows corresponding to 32 digit positions ranging from digit 0 position to digit 31 positon.

The present invention is primarily concerned with a reader which, when read in conjunction with a standard binary scale, generates signals which represent, in digital form, the data to be transmitted. This data may have any desired significance but frequently represents the instantaneous position of a movable member, or the value of a function such as a trigonometrical ratio of an angular displacement of a rotatable member.

Preferably the binary scale and reader are constituted by areas representing a change in the characteristic of a surface and the reading means comprises means for detecting and responding to the said change.

The change may be of an optical nature and the reading means may comprise a light-sensitive element responsive to the optical change such as a lead sulphide resistive cell and the like. Thus, for example, the binary scale and reader may comprise a plurality of transparent areas on a generally opaque background, or vice versa. The reading means may then comprise one or more light sources and one or more photo-cells located on opposite sides of the scale and the reader and a means is provided for causing relative movement between the scale and reading means. Where the reading means comprises single light sources and a plurality of photo-cells the reading may be accomplished by switching the photo-cells. Where the reading means comprises single photo-cells and a plurality of light sources the reading may be accomplished by switching the light sources. Where the reading means comprises both a plurality of light sources and a plurality of photo-cells, either the light sources or photo-cells may be switched to accomplish reading as will be understood by those skilled in the art.

Commonly, the reader used with a natural binary scale constructed with opaque areas representing binary "0" and transparent areas representing binary "1," comprises a single transparent area or slit traversing the columns of the scale parallel to the rows. The dimension of said area, measured along the column, is generally the same as the dimension of the transparent area of the column having the finest divisions, or as commonly known in the art, the least significant digit of a binary number. As the scale is traversed by the reader, each segment of the columns in the row defined by the reader slit is in turn exposed to the light source and a photo-cell. Thus, of a row in a scale of five columns, were read in proper sequence such that the readings were:

1st column—opaque
2nd column—transparent
3rd column—transparent
4th column—opaque
5th column—transparent this would correspond to the binary number 1 0 1 1 0 or the decimal number 22. This row then would be the decimal digit 22 position. In writing numbers in the binary scale, the usual convention of placing the most significant number first will be adopted throughout this specification.

In the natural binary scale such as shown in FIG. 1, in moving the above reader slit from row 15 to row 16, a change from transparent to opaque occurs in the first four columns, and the change from opaque to transparent occurs in the fifth column. If the light-sensitive element reading the fifth column be delayed in noting the change in the fifth column, a signal is produced misapprehending all five columns as being opaque giving a decimal digit reading of 0 instead of 16.

While certain prior art binary scales, such as the reflected binary scale, have been designed to obviate this difficulty by using a code which permits a change in only one column in progressing from one number to another, they have several other disadvantages. The first disadvantage is that the code cannot readily be used for arithmetic purposes. A conversion to the standard binary code is required before arithmetic can be readily accomplished. Secondly, its accuracy is limited by the accuracy of the divisions in all the columns, and since all columns must be read with the same accuracy as the column having the finest divisions, skewing between the reader and the scale cannot be tolerated. This places serious tolerance restrictions on the manufacture and mechanical mounting of such a scale and its associated reader. Thirdly, because the more significant columns can only be resolved on the small reader slit, the amount of light which can be directed to the light sensitive element is limited, thus limiting the sensitivity obtainable. The natural binary scale if read with a single slit reader also has some of the disadvantages of the reflected binary scale in addition to its ambiguity.

It is the object, therefore, to provide an improved reader for a natural binary scale which avoids one or more of the disadvantages of the prior art arrangements and will permit unambiguous reading.

It is a principal object of this invention to provide an improved reader for use with a natural binary scale which will permit increased reading accuracy and provide greater resolution by unlimited interpolation of the finest divisions of the scale.

It is a further object of this invention to provide an improved reader for a natural binary scale which will permit a higher resolution than that defined by the finest division on the scale.

It is a further object of this invention to provide an improved reader for a natural binary scale which will provide higher sensitivity in reading.

It is a further object of this invention to provide an improved reader for a natural binary scale which will provide increased reading accuracy while at the same time permitting greater tolerance in manufacture and mechanical mounting without adversely affecting reading accuracy.

In accordance with the invention, the improved reader for use with a natural binary scale may comprise a plate having a plurality *n* of columns of effectively opaque and effectively transparent durable areas, where *n* is the number of digits in the binary scale, adjacent columns progressing from one side of the reader connoting successively greater digital significance. The reader has one class of such reader areas disposed about a center line perpendicular to said columns, the reader areas in each column more significant than the least significant column of the reader being identically finite and of lesser columnwise dimension than like areas of the corresponding column of the natural binary scale with which it is to be used. The reader areas occur in each direction, along the column, away from the center line in the same cyclic repetition as the like areas of the corresponding columns of the natural binary scale with which the reader is to be used, the resulting array of said reader areas in each column of the reader more significant than the least significant column of the reader being symmetrically disposed about the center line. The reader areas of the least significant column of the reader being identically finite and equal in columnwise dimension to the columnwise dimension of like areas of the least significant column of the natural binary scale with which the reader is to be used. The least significant reader areas are arranged, when the reader center line is coincident with the zero index of the natural binary scale with which the reader is to be used, to provide at least two pairs of reader areas with one of each pair lying to either side of the reader centerline with one reader area of a pair being 180° out-of-phase with the other reader area of the pair and each pair of reader areas being out-of-phase with every other pair by an amount equal to 360° divided by the number of phases of the differently phased reader areas. When the reader is moved in a columnwise direction relative to the binary scale, the coincidence of one of a pair of reader areas 180° out-of-phase with each other, to one side of the reader center line with respect to like areas of the binary scale, increases while the coincidence of the other of the pair of the reader areas to the other side of the reader center line with respect to like areas of the corresponding column of the binary scale, decreases. Where there are more than one reader area in a series, the reader areas of each series occur at the same repetition rate as the like areas of the least significant column of the binary scale with which the reader is to be used.

The invention will be more clearly understood from the following description, given by way of example only, of various embodiments thereof, reference being directed to the accompanying drawings in which.

Figure 4:
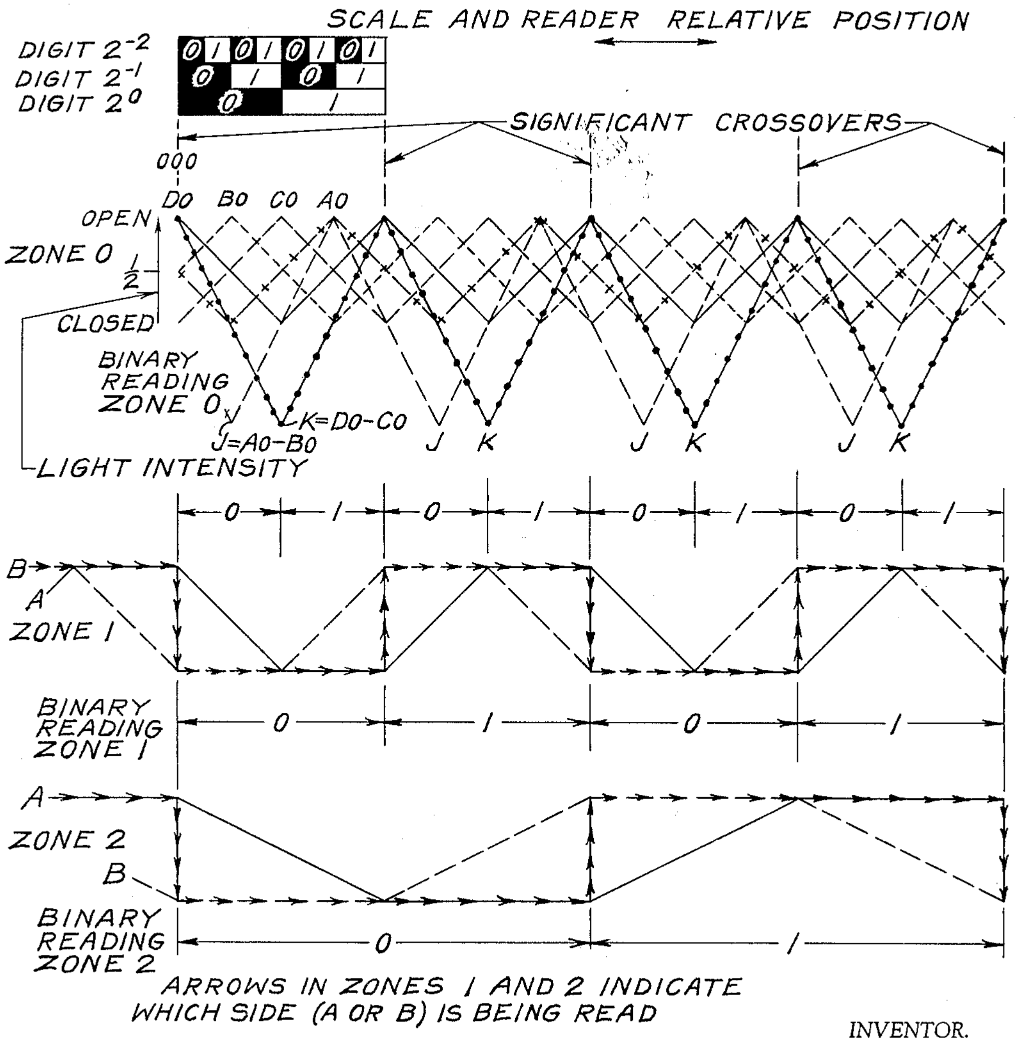
FIGURE 4 represents diagrammatically the variations in light intensities for a three zone or binary digit scale as a four phase reader according to the invention is moved to the right with respect to the scale.

FIGURES 8, 9, 10, 11, and 12 illustrate successive readings of a three column four phase reader of the invention with a three column natural binary scale giving light intensities represented by FIGURE 4 to provide a five binary digit reading.

Figure 13:
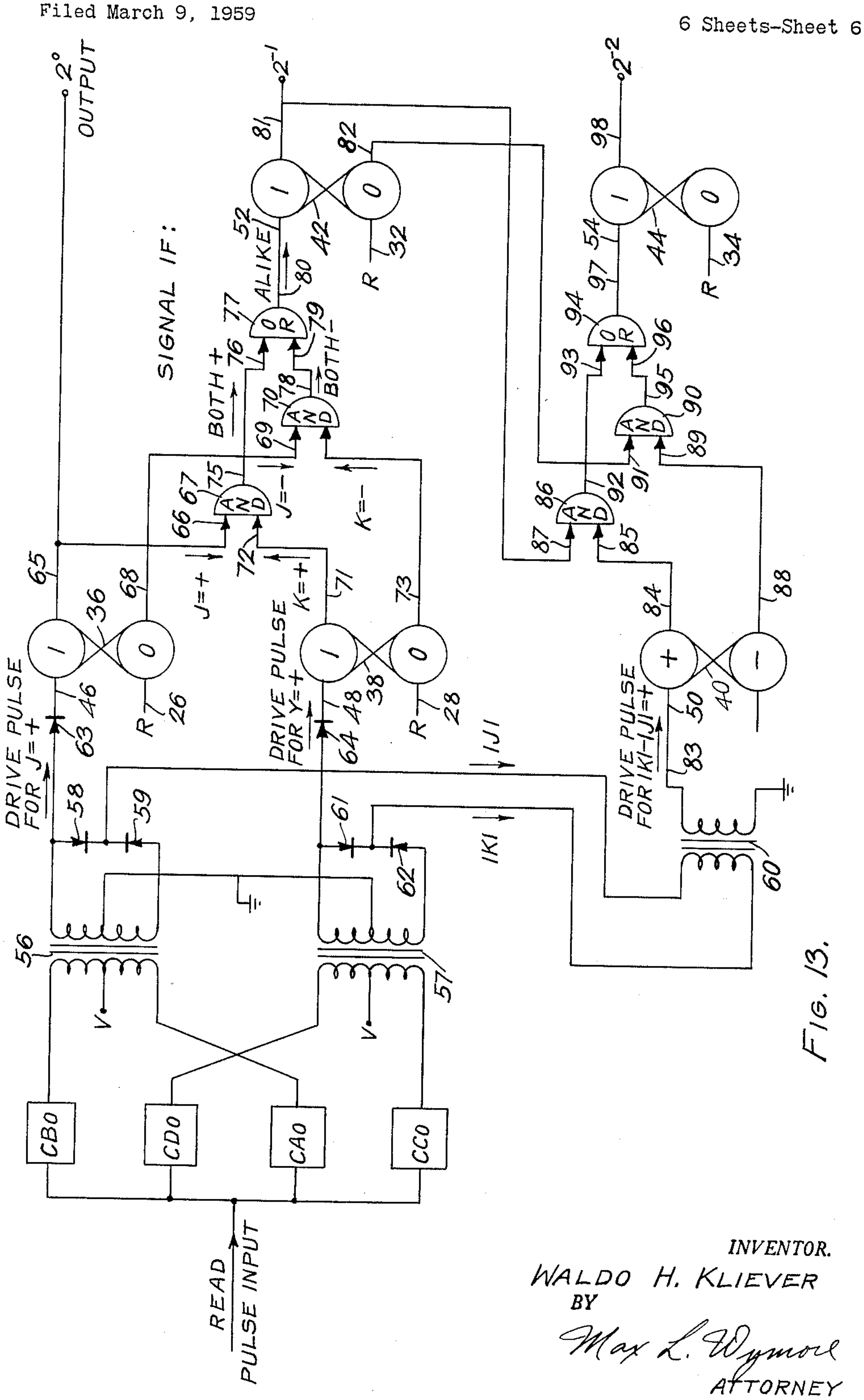

FIGURE 13 is a diagrammatic representation of an electronic logical circuit for accomplishing interpolation of the least significant column of a natural binary scale with a four phase reader according to this invention.

Figure 8:
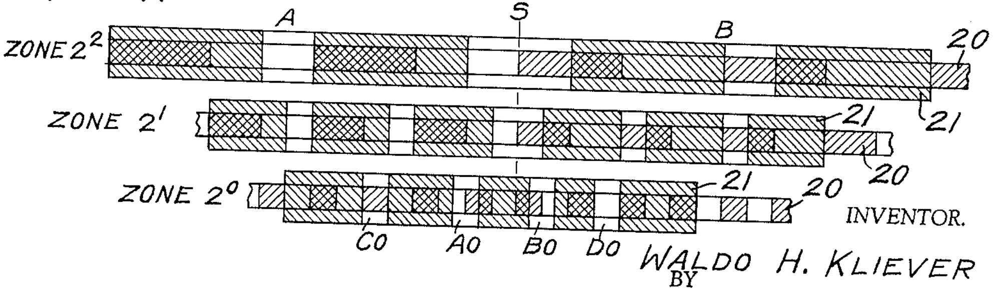
Figure 9:
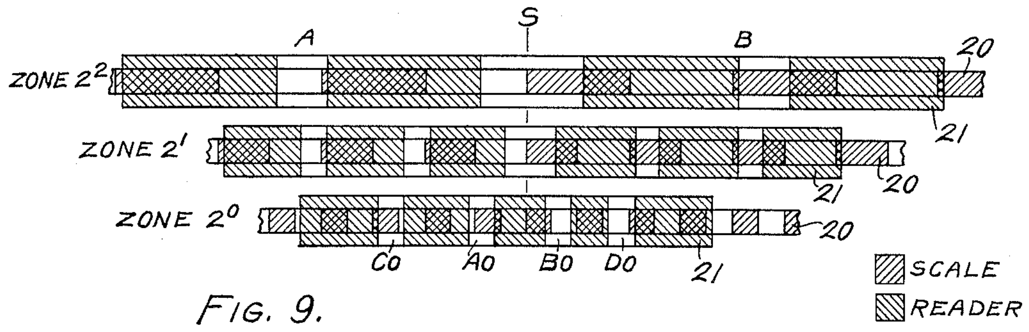
Figure 10:
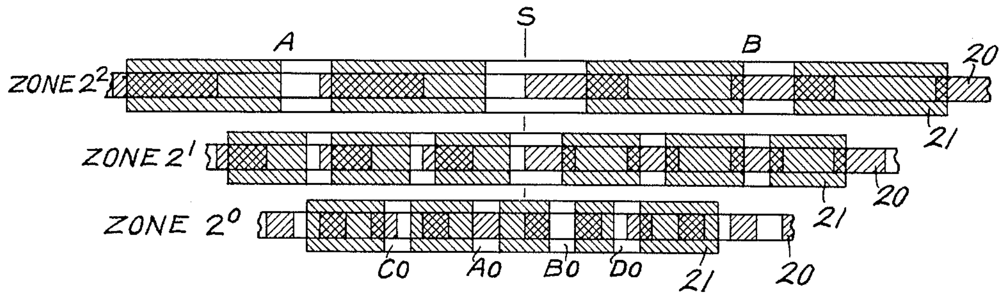
Figure 11:
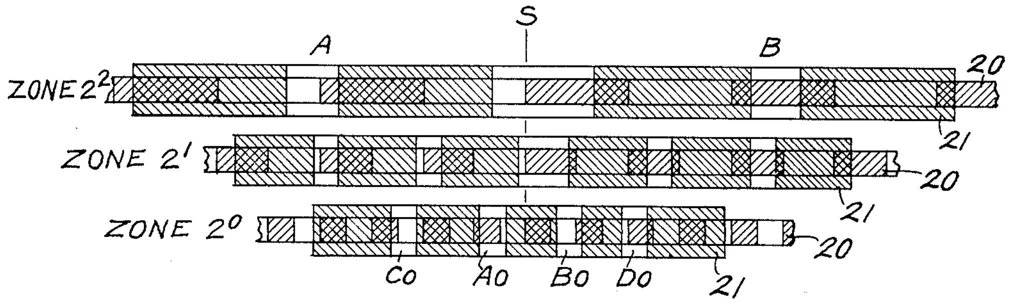
Figure 12:
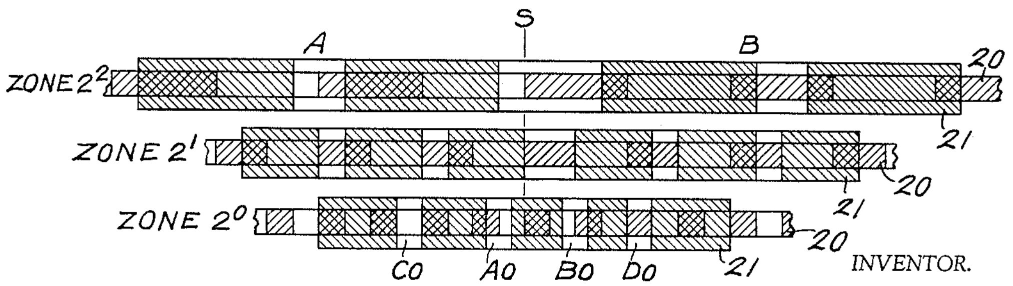

In contrast to a progressive scale and reader, scale readers according to the present invention use natural binary scales and are provided with two reading areas (hereinafter designated as by "A" and "B") in the columns more significant than the least significant column, one being slightly advanced from the normal position of the single slot of a conventional reader and the other similarly retarded as best appears in the FIGURE 8. The reading program for readers in accordance with the present invention is sequential from the so-called least significant (but actually most important) zone or column $2^0$ through more significant columns $2^1$, $2^2$, $2^3$ and $2^4$, FIGURE 1. The least significant column readings serve to select the appropriate reader for the successively higher-order digits by determining whether the A or B opening of the next column in sequence shall be read. This assures that all digits have correct values at the time of reading, even when the reading is very near a position where several digits need to change. Readers in accordance with this invention may conveniently be constructed in either a linear form or in a circular form as will be readily understood by those skilled in the art.

Figure 1:
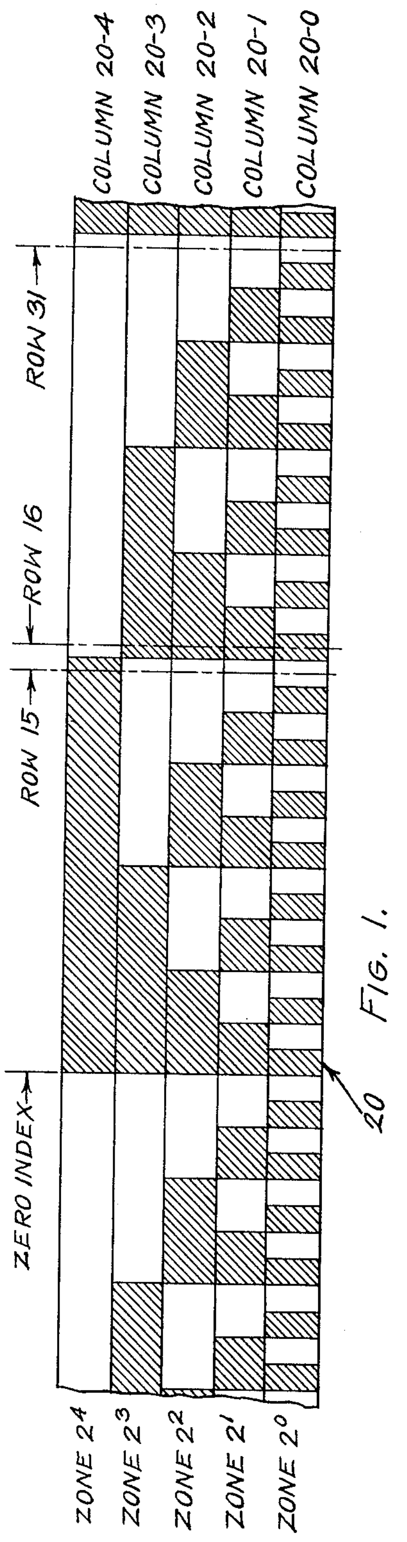
FIGURE 1 illustrates a pattern of effectively opaque and effectively transparent areas arranged in a natural binary code of five digits which represents on the binary scale the decimal digits 0 to 31.
Figure 2:
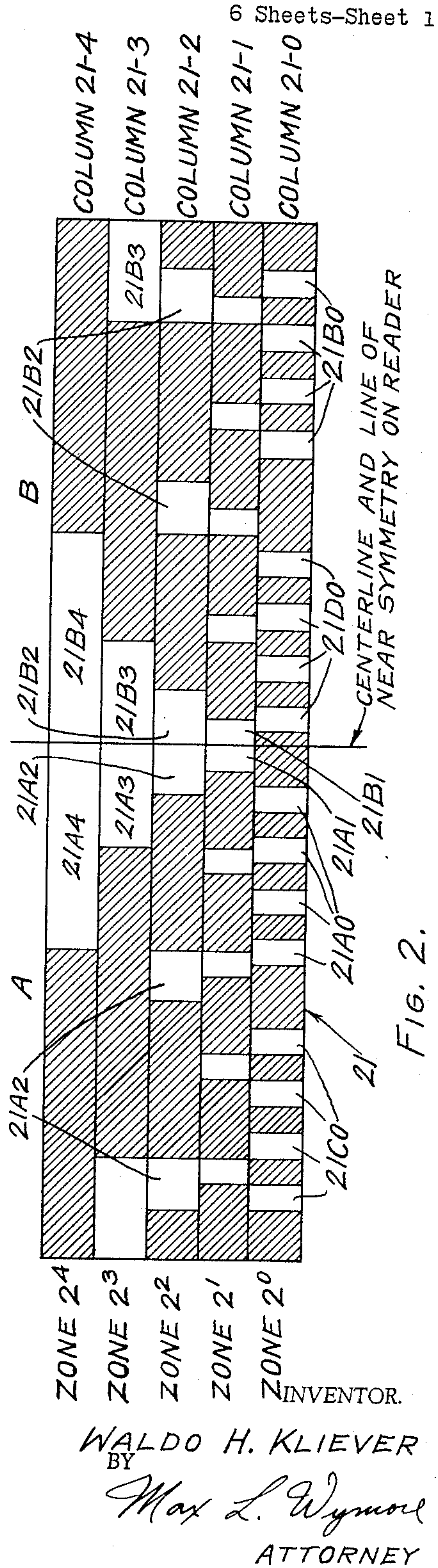
FIGURE 2 illustrates a pattern of effectively opaque and effectively transparent areas arranged according to one embodiment of the improved binary scale reader of this invention, illustrating a four phase least significant column.

FIGURE 2 shows an enlarged representation of one embodiment of a reader 21 according to the present invention. In each column thereof more significant than the least significant column, there are two sets of windows or transparent reading areas designated as A and B areas, i.e., 21A1, 21B1, 21A2, 21B2, 21A3, 21B3, etc. These windows have opaque and transparent areas like those of the corresponding scale, FIGURE 1, but are phased differently. In use there are two lamps or two photo-cells provided for each column (one for the A side, and one for the B side). Either of the cells for the lamps can be switched to obtain the desired reading. The described method is directed to switching the photo-cells.

Variation in light intensity passing through A and B occurs as standard binary scale generally identified by numeral 20 moves past reader 21 as shown in FIGURES 8 through 12. The switching circuit interprets the light intensity of selected areas as binary numbers, instantaneously representing the position of the scale. To achieve this result, the sections of scale 20 in each reader window A, B, must be properly phased. Because it is easier and more accurate to compare measurements than it is to determine absolute values, the cross-over point for digits on the least significant column is established at the point where the readings of A0 and B0 are unequal. Also, windows 21A0 and 21B0 are 180° out of phase with each other. In a four phase reader windows 21C0 and 21D0 are 180° out of phase with each other and 90° out of phase with windows 21A0 and 21B0. By comparing the readings obtained at each of these windows it is possible to interpolate the reading of the least significant column to gain higher resolution than the distance between the least significant column lines, as will be discussed in greater detail further in the description.

Figure 5:
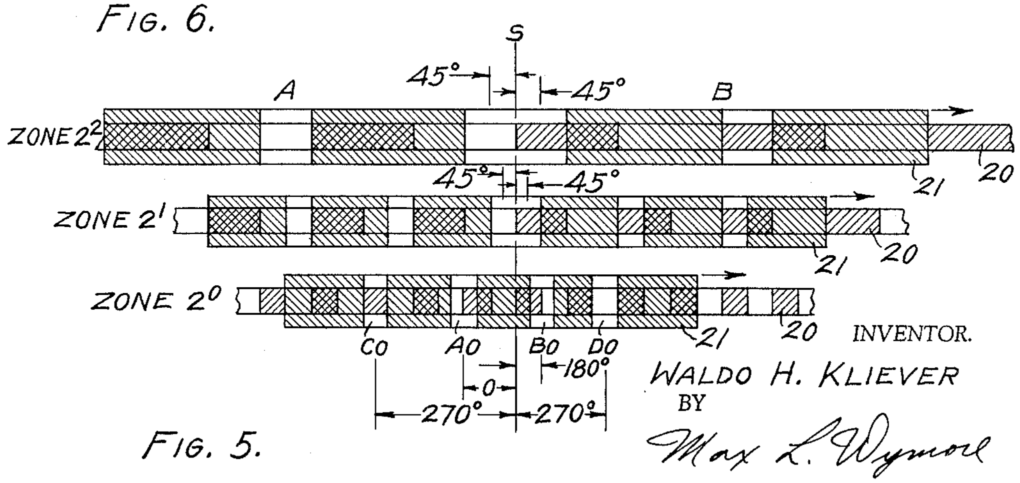
FIGURE 5 is a representation of the least significant column and the next; and, two more significant columns of a natural binary scale having super-positioned thereon a four phase interpolating reader of this invention with the centerline of the reader coincident with the zero index of the scale.

The phasing for the columns more significant than the least significant column is chosen to provide good contrast at the points where the reading of the least significant column calls for switching the reading of windows or areas, 21A1 to 21B1 or 21B1 to 21A1 in the next more significant column. The phasing of all zones will be better understood by referring to FIGURE 5, which shows one opening for each window on an enlarged scale. In FIGURE 5, the center line for all reader zones beyond the zero zone is placed on the natural binary scale at the zero index or binary 000 position. In this position, the reader is just at the change from binary 111 to binary 000. Note that A0 is 0° to the negative side or left and B0 is 180° to the positive side or right making them 180° apart.

Windows in zones beyond zone $2^0$ are 45° of the corresponding scale to the right and left of the center line respectively. This and the fact that the windows or reader areas on the reader for all zones beyond $2^0$ are one-half the width of the corresponding scale areas result in the flat top waves shown for zones $2^1$ and $2^2$ in FIGURE 4, so the readings theoretically on zones $2^1$ and higher are always all binary 0 or all binary 1, and no readings with partial values need be identified.

Figure 3:
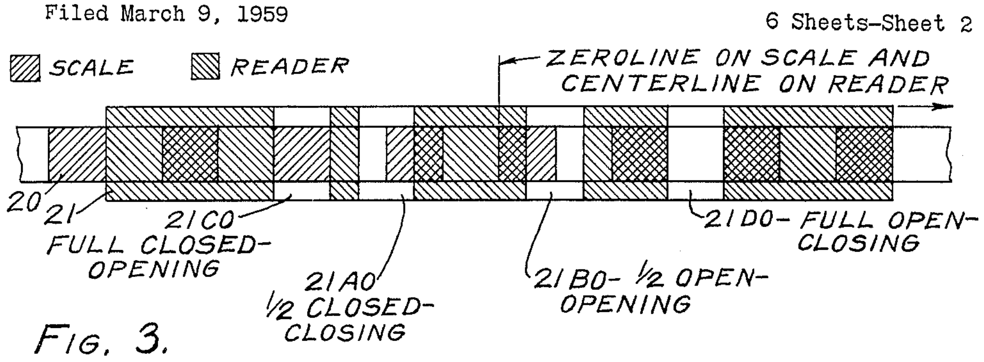
FIGURE 3 represents an enlargement of a four phase least significant column of one embodiment of the reader of this invention showing a single area of each series of reader areas in super position with the least significant column of a standard binary scale with the center line of the reader coincident with the zero index of the scale.

Referring to FIGURE 4, there is represented the instantaneous light intensities as the reader is moved to the right with respect to the scale. With a four phase reader as shown in FIGURES 3 and 5, four reader windows are provided in the least significant column or zone $2^0$, phased 90 degrees of the columnwise scale distance apart, the center of the vector figure is defined by the two averages of light intensities of pairs of reader areas 180 degrees apart. The difference in intensities of each pair can be treated as a vector itself and the angle in distance phase may be represented by a tangent as follows:

$$\tan e = \frac{A0 - B0}{D0 - C0} = \frac{J}{K}$$

The above equation is valid for all quadrants of one cycle by making use of the algebraic signs of the light intensity differences.

There are advantages in making the change of digits at cross over points where the light intensity of two areas are 180° out of phase. The cross over point then becomes independent of the intensity of the light source and variations in the sensitivity of photo-cells due to temperature and the like. Further, there is the advantage of being able to control the cross overs of all digits from a single zone or column as accomplished by the reader of applicant's copending application S.N. 573,154, above identified, now U.S. Patent No. 2,960,869 issued November 15, 1960.

The digits for the subdivisions of zone or column 0 may be identified as $2^{-1}$ and $2^{-2}$ etc. This means that when digits $2^{-1}$ and $2^{-2}$ change simultaneously, the cross over point will be determined by zone $2^0$, but at the point where zone $2^0$ does not itself change, digit $2^{-1}$ will have to provide a change of digit by-itself. Similar principles hold in the requirement for changing digit $2^{-2}$ and further subdivisions.

Referring to FIGURES 3 and 4, a reader with four reader areas, i.e. a four phase reader, will be described which will meet these requirements. FIGURE 3 shows the least significant column of a natural binary scale having a four phase reader constructed according to this invention super positioned thereon with the center line of the reader in alignment with the zero line of the scale. The reader is seen to have four windows A0, B0, C0 and D0, with A0 and B0 half open, B0 being past its maximum opening and A0 approaching its maximum. One complete cycle of the scale is defined as the columnwise distance along the scale equal to the sum of the columnwise widths of an effectively opaque area and an effectively transparent area. As the reader moves a distance along the scale equivalent to one cycle distance of the scale, one cycle of changes of light intensities will occur in A0, B0, C0 and D0. FIGURE 3 represents the reader and scale as being the decimal zero position and the phase will advance as the reader moves to the right and the scale remains stationary as shown progressively in FIGURE 4.

With the four phase reader of FIGURE 2, the light intensities directed to photo-cells by the least significant column of reader areas in cooperation with the least significant column of the scale of FIGURE 1, at the respective areas A0, B0, C0 and D0 will vary in intensity as shown by the curves for zone 0 in FIGURE 4. Also shown in FIGURE 4 are two quantities J, which is equal to A0–B0 and K, which is equal to D0–C0. It should be noted that these quantities can go to negative values even though the components are always positive. The quantities J and K are useful in our analysis. At the extreme top of FIGURE 4 are shown the values of the digits which are to be expressed in terms of the light intensities represented by the curves immediately below each.

In Table I are listed the digits along with information obtained from the photo-cells output. Here again it should be noted that only differences in values are used in order to compensate for variations of light intensity, photo-cell sensitivity, temperature changes, etc.

TABLE I

*Interpolation logic*

| Digit | | | Photo-cell Output | | | Distance for .0005 inch division |
|---|---|---|---|---|---|---|
| $2^0$ | $2^{-1}$ | $2^{-2}$ | J=B0−A0 | K=D0−C0 | J−K | |
| 1 | 1 | 1 | + | + | + | - - - - - - |
| 0 | 0 | 0 | − | + | + | .XX0000 in. |
| 0 | 0 | 1 | − | + | − | .XX0125 in. |
| 0 | 1 | 0 | − | − | − | .XX0250 in. |
| 0 | 1 | 1 | − | − | + | .XX0375 in. |
| 1 | 0 | 0 | + | − | + | .XX0500 in. |
| 1 | 0 | 1 | + | − | − | .XX0625 in. |
| 1 | 1 | 0 | + | + | − | .XX0750 in. |
| 1 | 1 | 1 | + | + | + | .XX0875 in. |
| 0 | 0 | 0 | − | + | + | .XX1000 in. |

With the above information, the logic for zone 0 is as follows:

(1) If J is —, read digit $2^0$ as 0;
If J is +, read digit $2^0$ as 1.

(2) If J and K have unlike signs, read digit $2^{-1}$ as 0;
If J and K have like signs, read digit $2^{-1}$ as 1.

(3) If K–J and digit $2^{-1}$ are + and 0 or — and 1, read digit $2^{-2}$ as 0;
If K–J and digit $2^{-1}$ are + and 1 or — and 0, read digit $2^{-2}$ as 1.

(4) If digit $2^0$ reads 1, switch zone 2 to read A;
If digit $2^0$ reads 0, switch zone 2 to read B.

Following the above logic, the $2^1$ zone has crossovers at the same position as the $2^0$ zone. All the higher order zones have crossovers not coincident with those of the next lower order.

While the selection of A1 or B1 on zone $2^1$ depends on whether J is + or —, the selection of A2 or B2 does not depend on whether A1 or B1 was read, but only whether the reading was bright or dark. In other words, it depends on whether the previous reading was 1 or 0. Rule 4 applies to all zones of high order than zone $2^0$ and can be stated:

(1) For zone 0
If J is —, read as 0
If J is +, read as 1

(5) for any higher order zone
Read A if the reading of the zone of the next lower order is 1;
Read B is the reading of the zone of the next lower order is 0.

(6) For the selected area of any zone above $2^0$ order
If the light intensity is bright, read 1;
If the light intensity is dark, read 0.

TABLE II

*Table of values (move windows to right)*

| On Zone $2^0$ | | On Zone $2^1$ | | On Zone $2^2$ | |
|---|---|---|---|---|---|
| Polarity of J | Read | Switch to— | Read | Switch to — | Read |
| − | 0 | $B^1$ | 0 | $B^2$ | 0 |
| + | 1 | $A^1$ | 0 | $B^2$ | 0 |
| − | 0 | $B^1$ | 1 | $A^2$ | 0 |
| + | 1 | $A^1$ | 1 | $A^2$ | 0 |
| − | 0 | $B^1$ | 0 | $B^2$ | 1 |
| + | 1 | $A^1$ | 0 | $B^2$ | 1 |
| − | 0 | $B^1$ | 1 | $A^2$ | 1 |
| + | 1 | $A^1$ | 1 | $A^2$ | 1 |
| − | 0 | $B^1$ | 0 | $B^2$ | 0 |
| + | 1 | $A^1$ | 0 | $B^2$ | 0 |

Table II above, referring to FIGURE 5, will be seen to demonstrate skilled logic as the reader windows of zones $2^0$ and higher order are moved to the right. For example, the first line shows that if J is —, read 0 and switch to B1. Then switch to B2 and again read 0. Lines below apply as the reader moves. As noted previously, the light intensities are theoretically such that on all zones of higher order than $2^0$, the readings are either a binary 1 or a binary 0 and it is not necessary to distinguish partial values. It will be recognized that the scale logic will be reversed if, when J is —, it is read as 1 and when J is +, it is read as 0. In practice with the finest division of the natural binary scale being 0.0005 inch, a two-mil spacing between the scale and the reader and moderately parallel light beams, the lowest light intensity of a binary 1 reading is five times the highest intensity of a binary 0 reading. This together with the large windows or reading areas in the higher order zones, makes readings highly independent of skew between scale and reader. Accuracy of measurement depends on the fine or $2^0$ zone and the higher order zones are essentially counters, permitting relatively large mechanical and electrical tolerance in the system without sacrifice of accuracy. An air floating system for achieving the controlled close spacing between the scale and reader forms the subject matter of my patent application S.N. 746,780, filed July 7, 1958, entitled "Positioning Device for Maintaining Close Controlled Spacing Between Movable Elements," now abandoned. It will be noted that as shown in FIGURE 2 the windows of the multiple phase reader may comprise a series of windows identically phased to provide a greater light output in the least significant column to give increased sensitivity. The windows of each of a series occur at the same repetition rate as like areas of a natural binary scale with which the reader is to be used.

Figure 6:
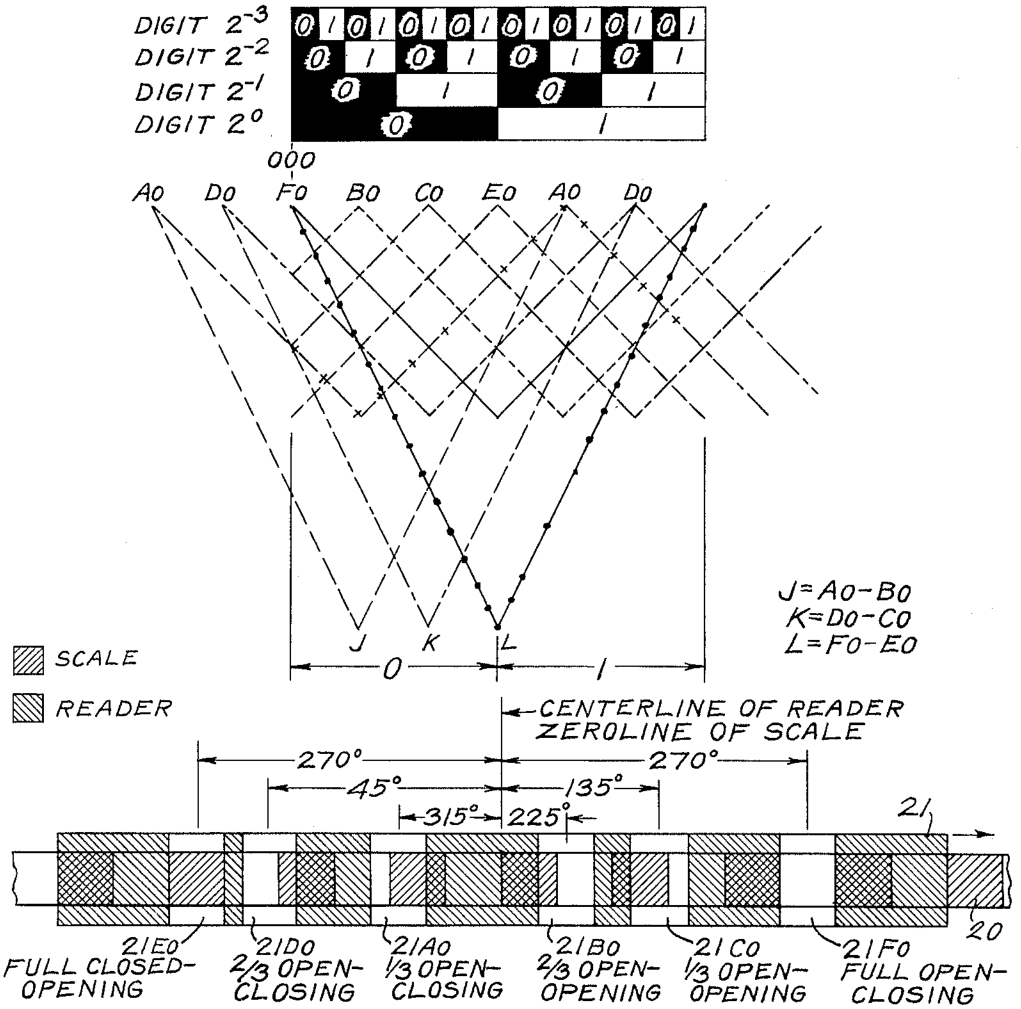
FIGURE 6 represents a six phase interpolating reader of this invention showing the least significant column of the reader super-positioned over the least significant column of the natural binary scale.
Figure 7:
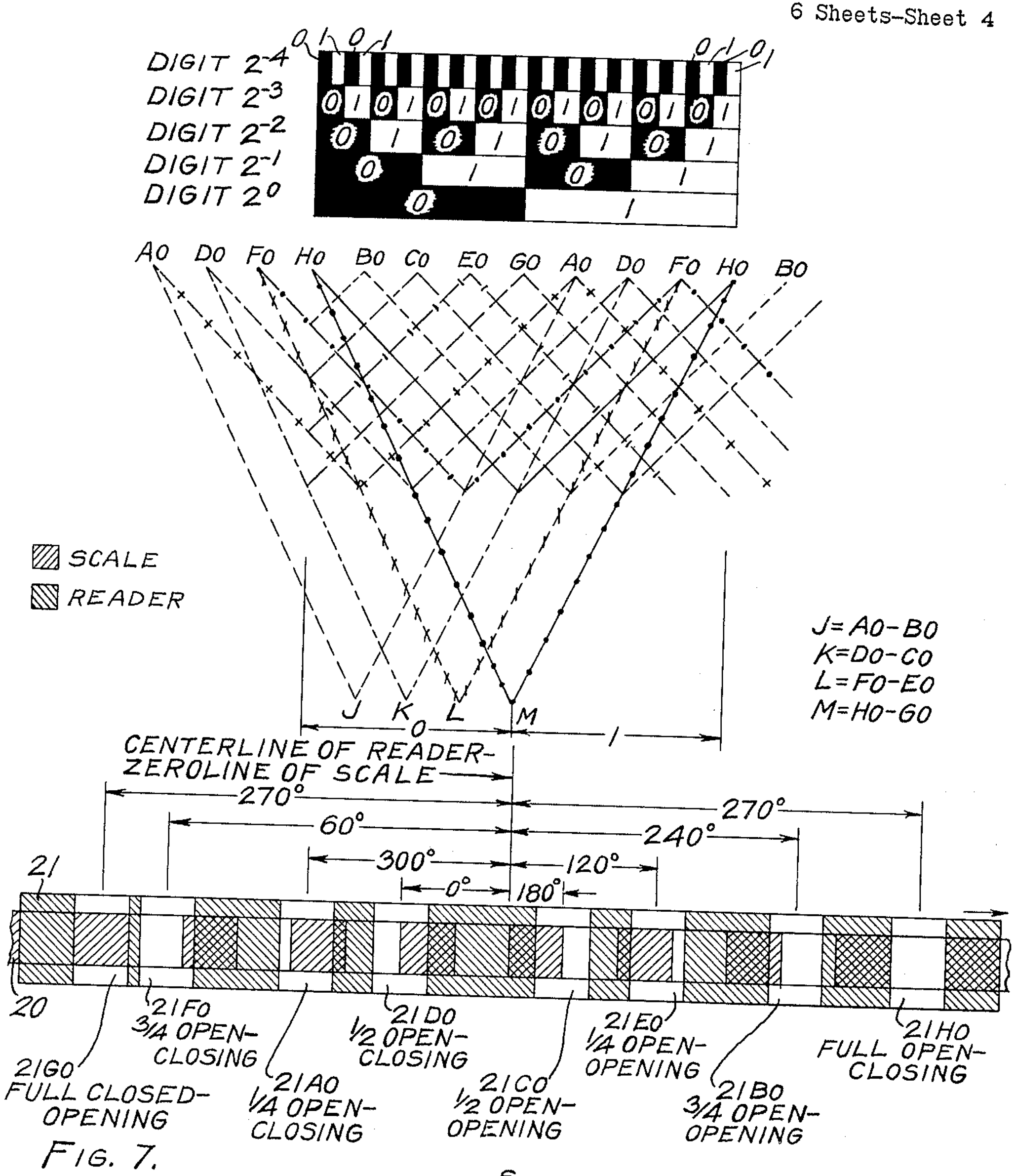
FIGURE 7 represents an eight phase interpolating reader of this invention showing the least significant column of the reader super-positioned above the least significant column of the natural binary scale.

While the description this far has been directed to a four-phase reader, it will be appreciated that a greater number of phases may be used as desired to effect a greater subdivision of the $2^0$ zone. Referring to FIGURES 6 and 7, there are shown the least significant column or $2^0$ zone of a six-phase reader and an eight-phase reader respectively. It will be noted in FIGURE 3 that in a four-phase reader when the reader center line is in alignment with the zero line of a natural binary scale, there are four sets or series of reader areas in the $2^0$ zone that are each in coincidence with like areas of the underlying scale to differing degrees. In the four-phase reader there are windows A0, B0, C0 and D0. Window A0 is in coincidence with ½ of a like area of the scale. Window B0 is also in coincidence with ½ of a like area of the scale, but as the scale moves with respect to the reader, the coincidence of one window, with a like area of the scale, increases while the other decreases. Window D0 is completely in coincidence with a like area of the scale, while C0 is completely out of coincidence with a like area of the scale.

Referring to FIGURE 6, the six-phase reader has six sets or series of reader areas in the $2^0$ zone. When the reader center line is in alignment with the zero line of a natural binary scale, each of the six reader areas are in coincidence with like areas of the scale to differing degrees. The reader areas are A0, B0, C0, D0, E0 and F0. Window A0 is in coincidence with ⅓ of a like area of the scale. Window B0 is also in coincidence with ⅓ of a like area of the scale, but as the scale moves with respect to the reader the coincidence of one window, with a like area of the scale, increases while the other decreases. Window F0 is in coincidence with ⅔ of a like area of the scale and window E0 is also in coincidence with ⅔ of a like area of the scale. Here again, the coincidence of one window with a like area of the scale, increases as the coincidence of the other decreases when the scale moves with respect to the reader. Window D0 is in complete coincidence with a like area of the scale, while window C0 is completely out of coincidence with a like area of the scale. Similarly an eight-phase reader, FIGURE 7, has eight sets or series of reader areas in the $2^0$ zone. When the reader center line is in alignment with the zero line of a natural binary scale, each of the eight reader areas are in coincidence with like areas of the scale to differing degrees. The reader areas are A0, B0, C0, D0, E0, F0, G0 and H0. Window A0 is in coincidence with ½ of a like area of the scale. Window B0 is also in coincidence with ½ of a like area of the scale, but as the scale moves with respect to the reader the coincidence of one window, with a like area of the scale, increases while the other decreases. Window E0 is in coincidence with ¼ of a like area of the scale. Window F0 is also in coincidence with ¼ of a like area of the scale, but as the scale moves with respect to the reader the coincidence of one window, with a like area of the scale, increases while the other decreases. Window G0 is in coincidence with ¾ of a like area of the scale. Window H0 is also in coincidence with ¾ of a like area of the scale, but as the scale moves with respect to the reader the coincidence of one window with a like area of the scale increases while the other decreases. Window D0 is in complete coincidence with a like area of the scale, while window C0 is completely out of coincidence with a like area of the scale.

With the center line of the reader of this invention in alignment with a natural binary scale, it will be seen that the coincidence and number of windows or reader areas bear a definite relation to the number of phases defined by the least significant column of the reader. The mathematical relationship can be seen from Table III below:

TABLE III

*Coincidence of reader areas with like areas of scale with centerline of reader aligned with zero line of scale*

| Number of Phases | | Areas to One Side | Reader Centerline | Areas to Other Side | |
|---|---|---|---|---|---|
| 4 | 0 | 1/2 | | 1/2 | 1 |
| 6 | 0 | 2/3 1/3 | | 1/3 2/3 | 1 |
| 8 | 0 | 3/4 1/2 1/4 | | 1/4 1/2 3/4 | 1 |
| 10 | 0 | 4/5 3/5 2/5 1/5 | | 1/5 2/5 3/5 4/5 | 1 |
| 12 | 0 | 5/6 2/3 1/2 1/3 1/6 | | 1/6 1/3 1/2 2/3 5/6 | 1 |
| 14 | 0 | 6/7 5/7 4/7 3/7 2/7 1/7 | | 1/7 2/7 3/7 4/7 5/7 6/7 | 1 |
| 16 | 0 | 7/8 3/4 5/8 1/2 3/8 1/4 1/8 | | 1/8 1/4 3/8 1/2 5/8 3/4 7/8 | 1 |
| 18 | 0 | 8/9 7/9 2/3 5/9 4/9 1/3 2/9 1/9 | | 1/9 2/9 1/3 4/9 5/9 2/3 7/9 8/9 | 1 |
| 20 | 0 | 9/10 4/5 7/10 3/5 1/2 2/5 3/10 1/5 1/10 | | 1/10 1/5 3/10 2/5 1/2 3/5 7/10 4/5 9/10 | 1 |

From Table III, it will be seen that the number of reader areas or sets of reader areas bears a definite relation to the number of phases of the reader. A reader having X phases provides an interpolation of the least significant column of the scale to $$\frac{X}{2}$$

places and the degree of coincidence of the reader areas to one side of the reader center line with like areas of the scale when the center line is aligned with the zero line of a scale is equal to $2/X$, $4/X$ . . . $X/X$ of the columnwise dimension of underlying like areas of the scale, there being $r$ number of reader areas in the $2/X$ series, $s$ number of reader areas in the $4/X$ series and $t$ number of reader areas in the $X/X$ series, where $r$, $s$ and $t$ are whole numbers and the coincidence of reader areas to the other side of the center line is equal to $$\frac{X-2}{X}, \frac{X-4}{X} \cdots \frac{X-X}{X}$$

of the columnwise dimension of underlying like areas of the scale, there being $u$ number of reader areas in the $$\frac{X-2}{X}$$

series, $v$ number of reader areas in the $$\frac{X-4}{X}$$

series and $w$ number of reader areas in the $$\frac{X-X}{X}$$

series, where $u$, $v$ and $w$ are whole numbers and the reader areas of each series occur at the same repetition rate as like areas of the scale with which the reader is to be used, where X is equal to the number of phases, there being $X/2$ areas to each side of the reader center line.

The coincidence of one of a pair of reader areas, 180° out-of-phase, to one side of the reader center line with a like area of the scale increases as the scale moves relative to the reader while the coincidence of the other of the pair of reader areas, 180° out-of-phase, to the other side of the centerline decreases.

Referring to FIGURES 5, 6 and 7, it will be seen that a four phase reader, X being 4, has four series or sets of reader areas in the least significant column consisting of two pairs, $$\frac{X}{2}$$

of series with one of a pair to either side of the reader center line. It will be further noted that each of a pair are 180° out of phase with the other (A0 and B0, C0 and D0) and each pair is $$\frac{360}{4}, \frac{360}{X}$$

or 90° out of phase with the other pair. For a six phase reader, FIGURE 6, there are six series or sets of reader areas in the least significant column consisting of three pairs of series with one of a pair to either side of the reader center line. Each of a pair is 180° out of phase with the other (D0 and C0, A0 and B0, E0 and F0) and each pair of areas are $$\frac{360}{6} \text{ or } 60°$$

out of phase with another pair of areas. With the six phase reader, the vectors will be $J=A0-B0$, $K=D0-C0$ and $L=F0-E0$. For an eight-phase reader, FIGURE 7, there are eight series or sets of reader areas in the least significant column consisting of four pairs of series with one of a pair to either side of the reader center line. Each of a pair is 180° out of phase with the other (D0 and C0, B0 and A0, F0 and E0, H0 and G0) and each pair of areas are $$\frac{360}{8} \text{ or } 45°$$

out of phase with another pair of areas. With the eight-phase reader, the vectors will be $J=A0-B0$, $K=D0-C0$, L=F0−E0 and M=H0−G0.

Thus it is seen that the reader areas in the least significant column of the interpolating reader of this invention comprises at least two pairs of reader areas with one of a pair to either side of the reader centerline with each reader area of a pair being 180° out-of-phase with the other reader area of the pair and each pair of reader areas being out-of-phase with every other pair of reader areas by an amount equal to 360° divided by the number of phases of the differently phased reader areas. More broadly defined, the reader areas of the least significant column of the interpolating reader of the invention comprises at least two pairs of differently phased reader areas with one of each pair lying to either side of the reader centerline with the reader areas of the pairs to one side of the centerline being out-of-phase one with the other. Stated another way, the reader comprises at least two pairs of reader areas having one of each pair lying to one side of a reader centerline with a reader area to one side of the centerline bearing one phase relation with a reader area to the other side of the centerline and a different phase relation to another reader area to the other side of the centerline.

Again referring to FIGURES 3, 6 and 7, depicting respectively four, six and eight phase readers, it will be noted that X is respectively 4, 6 and 8, that is X is an even number in excess of 2. It is further noted that X or 4, 6 and 8 complete cycles are divided by the areas of the respective readers to give the equivalent of $X/2$ half cycles of like or transparent areas. With the four phase reader of FIGURE 3, 4 complete cycles are divided by the reader, and in the position shown in the figure, 21D0 is fully open and 21B0 and 21A0 are each half open, giving two or $X/2$ half cycles. The reader of FIGURE 6 presents three or $X/2$ half cycles and the reader of FIGURE 7 presents four or $X/2$ half cycles. A half cycle being equal to the column wise dimension of a transparent area.

Referring to FIGURES 8 through 12, there is represented the light patterns when a four-phase reader according to this invention is moved to the right with respect to a natural binary scale from the zero position through the first five of the $2^{-2}$ digits.

Referring to FIGURE 13, there is shown the schematic diagram of an electronic circuit to provide the comparisons and computations for the $2^0$ zone (column 21–0) of a four-phase reader according to the invention following the rules set for previously. When a new reading is desired, a reset pulse, from a suitable source, is applied to the zero inputs 26, 28, 30, 32 and 34 of flip-flops 36, 38, 40, 42 and 44 resetting all flip-flops to the zero state. The flip-flops of FIGURE 13 may conveniently be a Z–8336 flip-flop such as manufactured by the Engineered Electronics Company of Santa Ana, California and as shown and described on page 6 of their catalogue No. 856A, which is a medium-speed, bistable multi-vibrator circuit. Other similar flip-flop circuits, including transistor circuits, may be used with equal success. The system is further seen to comprise two pair of sensing devices CA0, CD0 and CB0, CC0 adapted to sense the variations of light intensities of reader areas A0, D0, B0 and C0. Each pair of sensing devices A0, B0 and C0, D0 are connected in a bridge circuit to the ends of the primary winding of pulse transformers 56 and 57 respectively. The transformers are each provided with a center tap connected to a source of voltage V. The inputs of sensing devices CA0, CB0, CC0 and CD0 are connected in series and further connected to a source of readout voltage pulses for the purpose to be explained as the description progresses. The secondary windings of pulse transformers 56 and 57 are each provided with centertaps connected to ground potential. The ends of the secondary windings of pulse transformer 56 are each connected to an anode of diodes 58 and 59 connected together at their cathodes having the common cathodes connected to one side of the primary winding of pulse transformer 60. The ends of the secondary winding of pulse transformer 57 are each connected to an anode of diodes 61 and 62 connected together at their cathodes having the common cathodes connected to the other side of the primary winding of pulse transformer 60. One end of the secondary winding of pulse transformer 56 is connected serially through diode 63 to the 1 input 46 of flip-flop 36 and one end of the secondary winding of pulse transformer 57 is connected serially through diode 64 to the 1 input 48 of flip-flop 38. The 1 output 65 of flip-flop 36 serves as the output for the $2^0$ digit and would be used in selecting more significant digits of the scale using reading systems such as set forth and claimed in my copending applications S.N. 692,638 filed October 28, 1957 entitled "Binary Scale Reading System" and S.N. 617,415 filed October 22, 1956, entitled "Binary Scale Reading System," now U.S. Patent No 2,970,292 issued January 31, 1961.

The 1 output 65 of flip-flop 36 is further connected to one input 66 of an "and" gate 67 and the 0 output 68 of flip-flop 36 is connected to one input 69 of an "and" gate 70. The 1 output 71 of flip-flop 38 is connected to a second input 72 of gate 67 and the 0 output 73 is connected to a second input 74 of gate 70. The output 75 of gate 67 is connected to one input 76 of an "or" gate 77 and the output 78 of gate 70 is connected to a second input 79 of gate 77. The output 80 of gate 77 is connected to the 1 input 52 of flip-flop 42. The 1 output 81 of flip-flop 42 serves as the output for the $2^{-1}$ digit, while the 0 output 82 and 1 output 81 are useful in determining the $2^{-2}$ digit as will be explained.

The secondary winding of pulse transformer 60 has one end connected to ground potential and the other end 83 is connected to the positive input 50 of flip-flop 40. The positive output 84 of flip-flop 40 is connected to one input 85 of an "and" gate 86 and the 1 output 81 of flip-flop 42 is connected to a second input 87 of gate 86. The negative output 88 of flip-flop 40 is connected to one input 89 of an "and" gate 90 and the 0 output 82 of flip-flop 42 is connected to a second input 91 of gate 90. Output 92 of gate 86 is connected to one input 93 of an "or"

gate 94 and output 95 of gate 90 is connected to a second input 96 of gate 94. The output 97 of gate 94 is connected to the 1 input 54 of flip-flop 44 and the 1 output 98 thereof serves as the output for the $2^{-2}$ digit.

After all the flip-flops have been reset to their 0 positions or—in the case of flip-flop 40, by means of a reset pulse from a suitable source (not shown), a readout pulse is applied to all sensing devices. The readout pulse may result from manually closing a switch, the application of signals recorded on magnetic tape, the output from a multivibrator, or produced by means of a magnetron type multiple position beam switching tube, such as a MBS 6700 as marketed by the Burroughs Corporation, Detroit, Michigan and the like.

The output of sensing devices CA0 and CB0 are compared in pulse transformer 56 and the output thereof is a pulse equivalent to J. If J is positive, the pulse will set flip-flop 36 to its 1 position. If J is negative, flip-flop 36 remains in the 0 position. The output of sensing devices CB0 and CC0 are likewise compared in pulse transformer 57 and the output thereof is a pulse equivalent to K. If K is positive, the pulse will set flip-flop 38 to its 1 position. If K is negative, flip-flop 38 remains in the 0 position. The 1 output of flip-flop 36 provides the $2^0$ digit directly.

In order to determine the $2^{-1}$ digit it is necessary to know whether the algebraic signs of J and K are alike or unlike. More specifically if J and K are of like signs, flip-flop 42 will want to be set to a 1 which will be the output for the $2^{-1}$ digit. The signals on 1 outputs 65 and 71 of flip-flops 36 and 38 respectively are transmitted by "and" gate 67 only if both J and K are positive. If only one is positive and the other negative, no output will be produced on output 75 of gate 67. In a similar manner, an output will be produced by gate 70 when both J and K are negative. In either case the pulse, if there be one, will pass through "or" gate 77 and set flip-flop 42 to the 1 state. Flip-flop 42 is changed only where the signs of J and K are alike, otherwise the flip-flop 42 remains in the 0 state.

In order to obtain the $2^{-2}$ digit, it is necessary to derive a quantity, absolute magnitude of K minus absolute magnitude of J, i.e. $|K|-|J|$. These quantities are convenient because the $2^{-2}$ digit must change at the 45 degree phase points and this is where $|J|$ and $|K|$ change from a condition of one being larger to that of the other being larger. Diodes 58 and 59 at the output of pulse transformer 56 provide a positive pulse at their cathodes whether J is positive or negative and the magnitude of this pulse represents $|J|$. Likewise, diodes 61 and 62 provide a positive pulse at their cathodes equal to $|K|$. The pulses for $|J|$ and $|K|$ are compared in pulse transformer 60 to provide an output proportional to $|K|-|J|$. If this output is positive, the output sets flip-flop 40 to conduct on the positive side, otherwise the flip-flop remains in the negative state.

A comparison between the output of flip-flop 40 and flip-flop 42 is made similarly to that previously described for flip-flops 36 and 38. If the positive and 1 outputs of flip-flops 40 and 42 respectively are conducting or if the negative and 0 outputs are conducting, flip-flop 44 will be set to the 1 state; otherwise it will remain in the 0 state.

In all digits $2^0$, $2^{-1}$ and $2^{-2}$, a voltage at the 1 output terminals 65, 81 or 98 of flip-flops 36, 42 or 44 respectively represents a binary 1 for that digit, while an absence of a voltage on the 1 output represents a binary 0 for that digit. Flip-flops 36, 42 and 44 will hold the readings as long as desired or until reset to the 0 state by the application of a reset pulse in preparation for a new reading.

It will be apparent from the foregoing description that the least significant or $2^0$ column of the reader of the invention may be used separately as an indexing or reading means apart from the higher-order columns.

It will also be apparent that a multiple phase interpolating reader according to this invention may be constructed with a wide variety of phases and a reading system designed along the lines of FIGURE 13 may be used to provide electronic readings thereof.

In use the scale may be mounted on a linear displacable member of a machine and the reader on a fixed part. Sensing devices, such as photo cells and the like are mounted in registry with the reader openings. A sensing device is provided for each series of reader areas in the $2^0$ column and a sensing means is positioned on each side of the reader center line for all higher order columns. Means are provided for effecting relative movement between the scale and the reader. It will be appreciated that the scale can be fixed and the reader and sensing means movable.

While there have been described what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

I claim:

1. A binary scale reader having at least two pairs of reader areas with one of each pair lying to either side of the reader centerline with one reader area of a pair being 180° out-of-phase with the other reader area of the pair and each pair of reader areas being out-of-phase with every other pair by an amount equal to 360° divided by the number of phases of the differently phased reader areas.

2. The scale reader of claim 1 including a series of each of the differently phased reader areas occurring at the same repetition rate as like areas of a natural binary scale with which the reader is to be used.

3. A binary scale reader having at least two pairs of differently phased reader areas with one of each pair lying to either side of the reader centerline with the reader areas of the pairs to one side of the centerline being out-of-phase one with the other.

4. The binary scale reader of claim 3 including a series of reader areas of identical phase as each of the differently phased reader areas occurring at the same repetition rate as like areas of a natural binary scale with which the reader is to be used.

5. A binary scale reader having at least two pairs of reader areas having one of each pair lying to either side of the reader centerline with a reader area to one side of the centerline bearing one phase relation with a reader area to the other side of the centerline and a different phase relation to another reader area to the other side of the centerline.

6. The scale reader of claim 5 including a series of each of the differently phased reader areas occurring at the same repetition rate as like areas of a natural binary scale with which the reader is to be used.

7. For use with a scale having a column of alternate effectively opaque and effectively transparent durable areas of an identical finite columnwise dimension and having a zero index along one side of one such area, perpendicular to the column, an interpolating reader comprising a plate having a column of effectively opaque and effectively transparent durable areas disposed about a centerline which is perpendicular to the column, said reader areas being identically finite and equal to the columnwise dimension of like areas of the scale with which the reader is to be used, one class of said reader areas further being arranged to provide at least two pairs of differently phased reader areas with one of each pair lying to either side of the centerline with the reader areas of the pairs to each side of the centerline being out-of-phase one with the other.

8. For use with a scale having a column of alternate effectively opaque and effectively transparent durable areas of an identical finite columnwise dimension, an interpolating reader comprising a plate having a column of effectively opaque and effectively transparent durable areas disposed about a centerline perpendicular to the column, said reader areas being identically finite and equal in columnwise dimension to like areas of the scale with which the reader is to be used, one class of said reader areas being arranged to provide at least two pairs of reader areas with one of each pair lying to either side of the reader centerline with one reader area of a pair being 180° out-of-phase with the other reader area of the pair and each pair of reader areas being out-of-phase with every other pair by an amount equal to 360° divided by the number of phases of the differently phased reader areas.

9. For use with a natural binary scale, an interpolating reader comprising a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a centerline perpendicular to said columns, those reader areas in each column more significant than the least significant column of the reader being identically finite and of lesser columnwise dimension than like areas of the corresponding column of the natural binary scale with which the reader is to be used, said reader areas occuring in each direction, along the column, away from the centerline in the same cyclic repetition as the like areas of the corresponding column of the natural binary scale with which the reader is to be used, the resulting array of said reader areas in each column of the reader more significant than the least significant column of the reader being symmetrically disposed about said centerline, said reader areas of the least significant column of the reader being identically finite and equal in columnwise dimension to the columnwise dimension of like areas of the least significant column of the natural binary scale with which the reader is to be used, one class of said reader areas of the least significant column being arranged to provide at least two pairs of differently phased reader areas with one of each pair lying to either side of the centerline with the reader areas of the pairs to each side of the centerline being out-of-phase one with the other.

10. For use with a natural binary scale, an interpolating reader comprising a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a centerline perpendicular to said columns, those reader areas in each column more significant than the least significant column of the reader being identically finite and of lesser columnwise dimension than like areas of the corresponding column of the natural binary scale with which the reader is to be used, said reader areas occurring in each direction, along the column, away from the centerline in the same cyclic repetition as the like areas of the corresponding column of the natural binary scale with which the reader is to be used, the resulting array of said reader areas in each column of the reader more significant than the least significant column of the reader being symmetrically disposed about said centerline, said reader areas of the least significant column of the reader being identically finite and equal in columnwise dimension to the columnwise dimension of like areas of the least significant column of the natural binary scale with which the reader is to be used and said reader areas of the least significant column being arranged, to provide at least two pairs of reader areas with one of each pair lying to either side of the centerline with one reader area of a pair being 180° out-of-phase with the other reader area of the pair and each pair of reader areas being out-of-phase with every other pair by an amount equal to 360° divided by the number of phases of the differently phased reader areas.

11. In a binary scale and reader combination a natural binary scale comprising a plate having effectively opaque and effectively transparent durable areas, one class of such areas being arranged in accordance with a natural binary progression having a plurality $n$ of columns and a plurality of $2^n$ rows, where $n$ is the number of digits in the scale, adjacent columns progressing from one side of the scale having successively greater digital significance; and a reader comprising a plate having a plurality $n$ of columns of effectively opaque and effectively transparent durable areas mounted in superposition on said scale for contiguous movement relative thereto in the direction of the scale columns, said reader having said one class of such reader areas disposed about a centerline parallel with the rows of the scale, with the least significant column of said reader areas coactively associated with the least significant column of the scale, those reader areas in each column of the reader more significant than the least significant column being identically finite and of lesser columnwise dimension than the associated like areas of the scale, said reader areas occurring in each direction, along the column, away from the centerline in the same cyclic repetition as the like areas of the corresponding associated column of the scale, the resulting array of said reader areas, in each column of the reader more significant than the least significant column, being symmetrically disposed about said centerline, the reader areas of the least significant column of the reader being identically finite and equal in columnwise dimension to like areas of the least significant column of the scale with which the reader is to be used, one class of the reader areas being arranged to provide at least two pairs of reader areas with one of each pair lying to either side of the reader centerline with one reader area of a pair being 180° out-of-phase with the other reader area of the pair and each pair of reader areas being out-of-phase with every other pair by an amount equal to 360° divided by the number of phases of the differently phased reader areas.

12. For use with a natural binary scale, a reader comprising a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a reader centerline, those reader areas in each column more significant than the least significant column of the reader being identically finite and of lesser columnwise dimension than like areas of the corresponding column of the natural binary scale with which the reader is to be used, each of two first said reader areas centrally located in each column more significant than the least significant column of the reader having a centerline spaced from the reader centerline a distance equal to an integral P number of cycles on the corresponding column of the natural binary scale with which the reader is to be used less a distance in cycles equal to the expression $$P-\frac{q}{2}$$

where $q$ is the width of a reader area in such column in cycles, said reader areas occurring in each direction along the column away from the centerline, in the same cyclic repetition as the like areas of the corresponding column of the natural binary scale with which the reader is to be used, the resulting array of said reader areas in each column of the reader more significant than the least significant column of the reader being symmetrically disposed about said centerline, said reader areas of the least significant column of the reader being identically finite and equal to columnwise dimension of like areas of the least significant column of the scale with which the reader is to be used one class of said reader areas further being arranged to provide at least two pairs of reader areas with one of each pair lying to either side of the reader centerline with one reader area of a pair being 180° out-of-phase with the other reader area of the pair and each pair of reader areas being out-of-phase with every other pair by an amount equal to 360° divided by the number of phases of the differently phased reader areas.

13. For use with a natural binary scale a reader comprising: a plate having a plurailty $n$ of columns of effectively opaque and effectively transparent durable areas, where $n$ is the number of digits in the binary scale, adjacent columns progressing from one side of the reader connoting successively greater digital significance, said reader having one class of such reader areas disposed about a centerline, said reader areas in each column more significant than the least significant column of the reader being identically finite and of lesser columnwise dimension, than like areas of the corresponding column of the conventional binary scale with which it is to be used, the edges of each of two first said reader areas centrally located in each column more significant than the least significant column of the reader being contiguous with the centerline, said reader areas occurring, in each direction along the column away from the certerline, in the same cyclic repetition as the like areas of the corresponding column of the natural binary scale with which the reader is to be used, the resulting array of said reader areas in each column of the reader more significant than the least significant column of the reader being symmetrically disposed about said centerline, said reader areas of the least significant column being identically finite and equal in columnwise dimension to like areas of the last significant column of the scale with which the reader is to be used, one class of said reader areas further being arranged to provide at least two pairs of reader areas with one of each pair lying to either side of the reader centerline with one reader area of a pair being 180° out-of-phase with the other reader area of the pair and each pair of reader areas being out-of-phase with every other pair by an amount equal to 360° divided by the number of phases of the differently phased reader areas.

14. For use with a natural binary scale, a reader comprising: a plate having a plurality $n$ of columns of effectively opaque and effectively transparent durable areas, where $n$ is the number of digits in the binary scale, adjacent columns progressing from one side of the reader connoting successively greater digital significance; said reader having one class of such reader areas disposed about a centerline, said reader areas in each column more significant than the least significant column of the reader being identically finite and having a columnwise dimension not exceeding one-half that of like areas of the corresponding column of the natural binary scale with which it is to be used, the edges of each of two first said reader areas centrally located in each column more significant than the least significant column of the reader being contiguous with the centerline, said reader areas occurring, in each direction along the column away from the centerline, in the same cyclic repetition as the like areas of the corresponding column of the natural binary scale with which the reader is to be used, the resulting array of said reader areas in each column of the reader more significant than the least significant column of the reader being symmetrically disposed about said centerline, said reader areas of the least significant column of the reader being identically finite and equal in columnwise dimension to the like areas of the least significant column of the scale with which the reader is to be used, one class of said reader areas further being arranged to provide at least two pairs of reader areas with one of each pair lying to either side of the reader centerline with one reader area of a pair being 180° out-of-phase with the other reader area of the pair and each pair of reader areas being out-of-phase with every other pair by an amount equal to 360° divided by the number of phases of the differently phased reader areas.

15. In a binary scale and reader combination a natural binary scale comprising a plate having effectively opaque and effectively transparent durable areas, one class of such areas being arranged in accordance with a natural binary progression having a plurality $n$ of columns and a plurality of $2^n$ rows, where $n$ is the number of digits in the scale, adjacent columns progressing from one side of the scale having successively greater digital significance; and a reader comprising a plate having a plurality $n$ of columns of effectively opaque and effectively transparent durable areas mounted in superposition on said scale for contiguous movement relative thereto in the direction of the scale columns, said reader having said one class of such reader areas disposed about a centerline parallel with the rows of the scale, with the least significant column of said reader areas coactively associated with the least significant column of the scale, those reader areas in each column of the reader more significant than the least significant column being identically finite and of lesser columnwise dimension than the associated like areas of the scale, said reader areas occurring in each direction, along the column, away from the centerline in the same cyclic repetition as the like areas of the corresponding associated column of the scale, the resulting array of said reader areas, in each column of the reader more significant than the least significant column, being symmetrically disposed about said centerline, the reader areas of the least significant column of the reader being identically finite and equal in columnwise dimension to like areas of the least significant column of the scale with which the reader is to be used, one class of the reader areas being arranged to provide at least two pairs of reader areas with one of each pair lying to either side of the reader centerline with one reader area of a pair being 180° out-of-phase with the other reader area of the pair and each pair of reader areas being out-of-phase with every other pair by an amount equal to 360° divided by the number of phases of the differently phased reader areas, a plurality of sensing means positioned to each side of the reader centerline, with at least two sensing means in registry with a reader column and mounted for movement with the reader; and means for effecting relative movement between said reader and said scale in a direction along the column.

16. For use with a natural binary scale a reader comprising a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a reader centerline, those reader areas in each column more significant than the least significant column of the reader being identically finite and of lesser columnwise dimension than like areas of the corresponding column of the natural binary scale with which the reader is to be used, each of two first said reader areas centrally located in each column more significant than the least significant column of the reader having a centerline spaced from the reader centerline a distance equal to an integral P number of cycles on the corresponding column of the natural binary scale with which the reader is to be used, less a distance in cycles equal to the expression $$P-\frac{q}{2}$$

where $q$ is the width of a reader area in such column in cycles, said reader areas occurring in each direction along the column away from the centerline, in the same cyclic repetition as the like areas of the corresponding column of the natural binary scale with which the reader is to be used, the resulting array of said reader areas in each column of the reader more significant than the least significant column of the reader being symmetrically disposed about said centerline, said reader areas of the least significant column of the reader being identically finite and equal in columnwise dimension of like areas of the least significant column of the scale with which the reader is to be used, one class of said reader areas being arranged to provide at least two pairs of differently phased reader areas with one of each pair lying to either side of the centerline with the reader areas of the pairs to each side of the centerline being out-of-phase one with the other.

17. For use with a natural binary scale a reader comprising: a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a centerline, said reader areas in each column more significant than the least significant column of the reader being identically finite and of lesser columnwise dimension, than like areas of the corresponding column of the conventional binary scale with which it is to be used, the edges of each of two first said reader areas centrally located in each column more significant than the least significant column of the reader being contiguous with the centerline, said reader areas occuring, in each direction along the column away from the centerline, in the same cyclic repetition as the like areas of the corresponding column of the natural binary scale with which the reader is to be used, the resulting array of said reader areas in each column of the reader more significant than the least significant column of the reader being symmetrically disposed about said centerline, said reader areas of the least significant column of the reader being identically finite and equal in columnwise dimension to like areas of the least significant column of the scale with which the reader is to be used, one class of said reader areas being arranged to provide at least two pairs of differently phased reader areas with one of each pair lying to either side of the centerline with the reader areas of the pairs to each side of the centerline being out-of-phase one with the other.

18. For use with a natural binary scale, a reader comprising: a plate having a plurality $n$ of columns of effectively opaque and effectively transparent durable areas, where $n$ is the number of digits in the binary scale, adjacent columns progressing from one side of the reader connoting successively greater digital significance, said reader having one class of such reader areas disposed about a centerline, said reader areas in each column more significant than the least significant column of the reader being identically finite and having a columnwise dimension not exceeding one-half that of like areas of the corresponding column of the natural binary scale with which it is to be used, the edges of each of two first said reader areas centrally located in each column more significant than the least significant column of the reader being contiguous with the centerline, said reader areas occurring, in each direction along the column away from the centerline, in the same cyclic repetition as the like areas of the corresponding column of the natural binary scale with which the reader is to be used, the resulting array of said reader areas in each column of the reader more significant than the least significant column of the reader being symmetrically disposed about said centerline, said reader areas of the least significant column of the reader being identically finite and equal in dimension to the like areas of the scale with which the reader is to be used, one class of said reader areas being arranged to provide at least two pairs of differently phased reader areas with one of each pair lying to either side of the centerline with the reader areas of the pairs to each side of the centerline being out-of-phase one with the other.

19. For use with a scale having a column of alternate effectively opaque and effectively transparent durable areas of an identical finite columnwise dimension and having a zero index along one side of one such areas, perpendicular to the column, an interpolating reader comprising a plate having a column of effectively opaque and effectively transparent durable areas disposed about a centerline which is perpendicular to the column, said reader areas being identically finite and equal to the columnwise dimension of like areas of the scale with which the reader is to be used, one class of said reader areas further being arranged, when the reader centerline is coincident with the zero index line of the scale with which the reader is to be used, to provide at least two pairs of differently phased reader areas with one of each pair lying to either side of the reader centerline, with the reader areas of the pairs to one side of the centerline being out-of-phase one with the other and as the reader is moved relative to the scale, the coincidence of reader areas to one side of the reader centerline increases while the coincidence of reader areas to the other side of the reader centerline decreases.

References Cited by the Examiner

UNITED STATES PATENTS 2,960,869 11/60 Kliever et al. _________ 340—347

MALCOLM A. MORRISON, *Primary Examiner.*

WALTER W. BURNS, Jr., IRVING L. SRAGOW, *Examiners.*